(12) United States Patent
Bechtel et al.

(10) Patent No.: US 6,515,030 B1
(45) Date of Patent: Feb. 4, 2003

(54) DETERMINING PRODUCTION PARAMETERS OF SCALE FLOW DEVICE

(75) Inventors: Siegfried Bechtel, Lampertheim (DE); Sabine Kielhorn-Bayer, Maxdorf (DE); Klemens Mathauer, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/581,820

(22) PCT Filed: Dec. 18, 1998

(86) PCT No.: PCT/EP98/08328

§ 371 (c)(1), (2), (4) Date: Jun. 19, 2000

(87) PCT Pub. No.: WO99/32220

PCT Pub. Date: Jul. 1, 1999

(30) Foreign Application Priority Data

Dec. 19, 1997 (DE) .......................... 197 56 874

(51) Int. Cl.$^7$ .......................... B01F 11/02; B01F 17/02; C08F 2/56; C08L 23/08
(52) U.S. Cl. .......................... 516/58; 366/116; 366/127; 422/128; 516/924; 524/836; 524/845; 526/909
(58) Field of Search ................. 366/116, 127; 516/58, 924; 422/128; 526/909; 524/836, 845; 73/1.16, 861.18, 632, 61.45, 865.5, 865.9; 436/807

(56) References Cited

U.S. PATENT DOCUMENTS

| | | | | | |
|---|---|---|---|---|---|
| 2,579,908 A | * | 12/1951 | Davison et al. | ......... | 526/909 X |
| 2,606,174 A | * | 8/1952 | Kolthoff et al. | ......... | 422/128 X |
| 3,266,631 A | | 8/1966 | Snaper | ......... | 210/542 |
| 4,009,140 A | * | 2/1977 | Teer et al. | ......... | 524/836 X |
| 4,071,225 A | | 1/1978 | Holl | ......... | 366/114 |
| 4,444,961 A | | 4/1984 | Timm | ......... | 526/88 |
| 4,902,741 A | * | 2/1990 | Burroway et al. | ......... | 524/836 |
| 5,032,027 A | | 7/1991 | Berliner, III | ......... | 366/15 |
| 5,108,654 A | | 4/1992 | Ragaini | ......... | 422/135 X |
| 5,121,629 A | * | 6/1992 | Alba | ......... | 71/61.41 |
| 5,202,375 A | * | 4/1993 | Biale | ......... | 524/845 X |
| 5,466,722 A | | 11/1995 | Stoffer et al. | ......... | 522/51 |
| 5,538,628 A | | 7/1996 | Logan | ......... | 210/198.1 |
| 5,577,669 A | | 11/1996 | Vujnovic | ......... | 241/1 |

FOREIGN PATENT DOCUMENTS

| | | |
|---|---|---|
| DE | 17 73 768 | 9/1958 |
| DE | 1 520 102 | 7/1969 |
| DE | 28 46 462 | 4/1979 |
| DE | 39 30 052 | 3/1991 |
| DE | 195 34 232 | 3/1997 |
| DE | 196 12 349 | 12/1997 |
| EP | 0 584 685 | 3/1994 |
| FR | 1489868 | 7/1967 |
| FR | 2 395 071 | 1/1979 |
| GB | 873798 | 7/1961 |
| GB | 1 209 943 | 10/1970 |
| GB | 1 401 072 | 7/1975 |
| GB | 2 248 622 | 4/1992 |
| GB | 2 250 930 | 6/1992 |

OTHER PUBLICATIONS

Patent Abstracts of Japan, vol. 95, No. 6, Jul. 31, 1995, JP 07 062008, Mar. 7, 1995.

* cited by examiner

*Primary Examiner*—Richard D. Lovering
(74) *Attorney, Agent, or Firm*—Oblon, Spivak, McClelland, Maier & Neustadt, P.C.

(57) ABSTRACT

A device for producing disperse mixtures by ultrasound, containing a housing, and a reaction chamber within the housing and at least one sonotrode having a free emitting surface which is directly in effective connection with the reaction chamber and whose end remote from the free emitting surface is coupled to an ultrasonic transducer, wherein the sonotrode is designed as a rod-shaped, axially emitting longitudinal oscillator with the emitting surface corresponding essentially to the surface of the reaction chamber, and wherein the reaction chamber depth which is essentially vertical with respect to the emitting surface is lower than a maximum effective depth of the sonotrode.

9 Claims, 3 Drawing Sheets

DETERMINING PRODUCTION PARAMETERS OF SCALE FLOW DEVICE

This application is a 371 of PCT/EP 98/08328, filed Dec. 18, 1998.

BACKGROUND OF THE INVENTION

1. Field of the Invention

The invention relates to a device for producing disperse mixtures by means of ultrasound and to advantageous uses of such a device. The invention relates in particular to a device for producing miniemulsions, i.e. emulsions having an average droplet diameter of less than 1 μm.

2. Discussion of the Background

Emulsions are disperse multiphase systems comprising at least two liquids which are virtually insoluble in one another, and they possess great importance in the plastics industry, especially in the detergents and cleaning products industry, in the production of cosmetic or pharmaceutical products and, in particular, in food technology as well. Since emulsions comprise at least one hydrophilic and one lipophilic liquid, a distinction is made—depending on the nature of the internal, disperse phase—between oil-in-water (O/W) and water-in-oil (W/O) emulsions. The internal or the external phase may itself in turn be a disperse system and may, for example, include particles of solids dispersed in the respective liquid phase. An overall system of this kind is also referred to as a polyphase emulsion. Owing to the interfacial tension which exists between the drops of the internal phase and of the continuous, external phase, emulsions are in general thermodynamically unstable and so over time there is a phase separation which may be induced, for example, by drop sedimentation or coagulation. In order to prevent such separation it is common to add emulsifying auxiliaries, such as emulsifiers, which lower the interfacial tension, or stabilizers, which, for instance, prevent—or at least greatly retard—the sedimentation of the droplets, by increasing the viscosity of the continuous, external phase.

When the at least two components of an emulsion are mixed, the initial result is a coarsely disperse crude emulsion. By supplying mechanical energy, the large drops of the crude emulsion are broken up and the desired fine emulsion is formed. The smallest droplet size achievable in the emulsification process depends not only on the respective input of power in the emulsifying machine but is also critically influenced by the nature and concentration of the emulsifying auxiliaries. For example, in order to produce ultrafine emulsions, the new interfaces which are formed mechanically must be occupied very rapidly by the emulsifier in order to prevent coalescence of the small droplets.

The average size of the droplets of the disperse phase can be determined in accordance with the principle of quasielastic dynamic light scattering (for example, as the z-average droplet diameter $d_z$ of the unimodal analysis of the autocorrelation function). In the examples of this document, this was done using a Coulter N4 Plus Particle Analyser from Coulter Scientific Instruments.

A wide variety of dispersing machines are employed for producing emulsions. Emulsions of medium to high viscosity are produced principally by means of rotor-stator systems, such as colloid mills or gear-rim dispersing machines. Low-viscosity emulsions have to date been produced principally using high-pressure homogenizers (HPH). In this case the crude emulsion under a pressure of between 100 and 1000 bar is discharged through the approximately 10 to 200 μm high radial gap of a homogenizing nozzle. It is assumed that drop breakup in this case is mainly attributable to the effect of cavitation. One specific design of a high-pressure homogenizer is the microfluidizer, which operates at relatively low pressures of about 100 bar. However, high-pressure homogenizers are not without their disadvantages. Especially when emulsifying polymerizable systems or when producing multiphase emulsions using particles of solids, it is easy for the narrow radial gap to become clogged. The cleaning subsequently required is time-consuming and complex. Moreover, the high pressures entail sealing problems, especially when using media which attack the sealants. A further disadvantage of high-pressure homogenizers is that the drop size and the throughput are coupled with one another. Apparatus of this kind is therefore unsuitable for producing miniemulsions in whose disperse phase it is intended to disperse particles of solids.

It is known, moreover, that ultrasound can be employed to produce emulsions, to mix fluid mixtures thoroughly or to deagglomerate particles.

German Utility Model Application DE-GM 17 73 768 describes a vessel for ultrasonic treatment of a medium. The sonotrode is attached externally to the vessel wall. Consequently, neither a long range cavitation front nor a sufficient input power for the production of miniemulsions can be achieved. A floating reflector is arranged in the prior art vessel so that the vessel cannot be made pressure-sealed.

U.S. Pat. No. 4,444,961 describes a method for producing polymer beads having narrow particle size distribution. A monomer phase is injected through an orifice plate into a continuous phase. A vibratory exciter is used to induce a oscillatory movement of a piston such that laminer monomer jets which are formed at the orifice plate are broken up into separate droplets. Such an arrangement is suitable only to produce droplets having a diameter in the range of 1 mm or more. Otherwise, the openings in the orifice plate would have to be very small, thus increasing the risk of clogging. In addition, oscillatory frequencies in the range of 100 to 1000 Hertz used in the prior art method are too low for producing fine dispersions.

In German Patent Application DE 39 30 052 A1 an acoustic transducer for sono-chemical reactions is described. The transducer, working in a frequency range of 200 MHz to 2 GHz is not suitable for producing emulsions because cavitation as a major action for dispersing droplets is no longer effective at these high frequencies. Further, the flow cell described in this document has disadvantages: Sonic waves are concentrated in a small local working area within the flow cell such that it cannot be assured that the whole medium is uniformally sonicated.

From GB 2 250 930 A a through-flow device for the ultrasonic treatment of liquid media is known. In this device, an axially emitting sonotrode protrudes into the flow cell. The diameter of the sonotrode is small relative to the diameter of the reaction chamber.

A similar arrangement is also described in U.S. Pat. No. 5,108,654.

Moreover, European Patent Application EP 0 584 685 A2 discloses a reactor for implementing chemical reactions, in which at least 9 ultrasonic emitters are arranged on, or integrated into, the wall of a stirred kettle.

The known ultrasonic devices, however, have numerous disadvantages. Although the dimensions of the flow channels and/or reaction chambers mean that it is possible to avoid the risk of clogging known from high-pressure homogenizers, the achievable droplet size cannot be adequately predetermined using the known ultrasonic devices. For example, the Applicant has found that the droplet size increases as the viscosity of the disperse phase goes up. Moreover, a limiting size is reached which is dependent on the specific power input and below which it is impossible to pass even by further lengthening the sonication period. Even this theoretical limiting drop diameter is only achieved if the emulsifying auxiliaries that are used occupy the interface with sufficient rapidity.

In the case of the rodlike sonotrodes that protrude into the reaction chamber, sonication is limited to the area directly surrounding the end of the sonotrode. The major part of the reaction chamber is either not sonicated at all or is sonicated inadequately.

In an ultrasonic device for producing emulsions described in German Patent Application DE 196 12 349 A1, it is foreseen to direct the medium which has to be emulgated via a nozzle onto a sonotrode. While it can be assured that the whole medium is, at least for a short period of time, treated in the ultrasonic field, there is a danger that some fractions of the medium will quickly leave the treatment cell, while other fractions remain quite long under the effect of the sonotrode. A similar arrangement is described in U.S. Pat. No. 5,032,027.

Finally, in FIG. 2 of German Patent Application DE 28 46 462 a flow chamber for producing emulsions by means of ultrasound is shown, wherein said flow chamber is formed by the front faces of two sonotrodes. The slit foreseen between the two sonotrodes is rather narrow (3 to 25 mm) such that the device is less suitable for use in emulsion polymerization on an industrial scale.

A particular disadvantage associated with known devices is that process parameters determined on the laboratory scale cannot be reliably transferred to the industrial scale. This is because the achievable drop diameter depends on numerous parameters, including the frequency and power of the ultrasound, the vibration amplitude, the sonication period, the dynamic viscosity and density of the continuous and of the disperse phase, and the interfacial tension. If, for example, optimum process parameters for a given system are determined on the laboratory scale, these data cannot be transferred directly, with the known devices, to the industrial scale.

SUMMARY OF THE INVENTION

It is an object of the present invention to indicate a device which permits the direct transfer of laboratory process parameters to large-scale industrial productions. A further intention of the device of the invention is to make it possible to incorporate even soluble and/or poorly soluble substances into the developing multiphase system in the course of emulsification.

We have found that this object is achieved by a device for producing disperse mixtures by means of ultrasound, having a housing, a reaction chamber within the housing and at least one means of transmitting ultrasonic waves, said means having a free emitting surface which is in effective connection with the reaction chamber, in which device the emitting surface of the means of transmitting ultrasonic waves corresponds essentially to the surface of the reaction chamber and, if the reaction chamber is a subsection of a through-flow reaction channel, extends essentially over the entire width of the channel, and wherein the reaction chamber depth which is essentially vertical with respect to the emitting surface is lower than the maximum effective depth of the ultrasound transmission means.

The device of the invention is accordingly configured so that the entire reaction chamber can be sonicated uniformly with ultrasonic waves. The sonic dead spaces which occur with conventional ultrasound emulsifying devices are largely eliminated with the device of the invention.

DETAILED DESCRIPTION OF THE INVENTION

Figure 1:
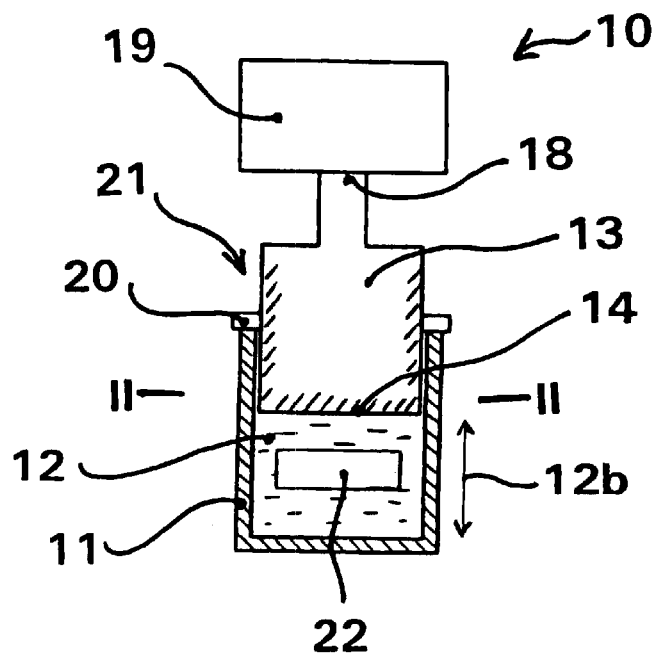
FIG. 1 shows a diagrammatic cross section of a batchwise-operating embodiment of the device of the invention.

The term "reaction chamber depth" refers here essentially to the distance between the emitting surface of the ultrasound transmission means and the floor of the reaction chamber. The effective depth of the ultrasonic field which is irradiated into the medium for treatment can be regarded as the region in which cavitation is induced. It is, indeed, primarily the cavitation which brings about the comminution of the large drops of the crude emulsion in the case of ultrasound processes. For optimum sonication, the reaction chamber depth should be in the region of the near-field length $l_N$ of the emitting surface of the ultrasound transmission means. By the near-field length $l_N$ is meant the thickness of the cylindrical cavitation region located directly below the emitting surface, the diameter of which region corresponds to the diameter of the emitting surface, $d_A$. Outside this near field, the diameter of the cavitation region becomes smaller with increasing distance from the emitting surface, until at a certain distance cavitation breaks down completely. The near-field length is a product of the diameter of the emitting surface, $d_A$, the ultrasonic frequency, f, and the speed of sound in the medium, $c_M$ $$l_N = (d_A^2 f)/(4c_M)$$

The speed of sound in the medium may vary considerably depending on the gas content. For example, the speed of sound in water, $C_{aq}$, is approximately 1450 m/s, while in air it is about 334 m/s. However, if air is dissolved in the water, ultrasonication induces a degassing process which leads to a mixture of water and small bubbles of air. In this mixture, the speed of sound is only about 70 m/s. Accordingly, with an emitting surface diameter of about 30 mm and an ultrasonic frequency of about 30 kHz, the near-field length, depending on the air content in the water, may vary between about 5 mm and 80 mm. This, therefore, is also the range within which the reaction chamber depth should be situated.

In the device of the invention this depth can thus be up to a few tens of millimeters. With such a depth there is no longer a risk of clogging, even when producing multiphase emulsions with particles of solids or when treating polymerizable emulsions. Moreover, the large dimensions of the reaction chamber facilitate the cleaning of the device.

It has surprisingly been found that the device produces satisfactory emulsification results even with reaction chamber depths which are substantially greater than the near-field length $l_N$. A likely explanation for this is that in the device of the invention a high axial rate component is induced, leading to intensive and complete cross-mixing of the medium. If required, mixing can be intensified still further by an additional stirrer mechanism.

Under the conditions which prevail on both the laboratory and the production scale, therefore, reaction chamber depths of up to 100 mm are preferred. The depth of the reaction chamber should advantageously not be more than 70 mm, and with particular advantage not more than 50 mm. The reaction chambers may in principle also have a very small depth, although in view of a minimal risk of clogging, maximum ease of cleaning and high product throughput, preference is given to reaction chamber depths which are substantially greater than, for instance, the customary gap heights in high-pressure homogenizers and are usually more than 10 mm, preferably more than 20 mm and particular preferably more than 26 mm. In one advantageous embodiment of the invention the reaction chamber depth can be altered by means, for example, of ultrasound transmission means which enter the housing to differing extents.

In accordance with a first embodiment of the device of the invention, the emitting surface of the means of transmitting ultrasound corresponds essentially to the surface of the reaction chamber. This embodiment is used for the batchwise production of disperse mixtures. With the device of the invention, ultrasound is able to act on the entire reaction chamber. In the reaction chamber, the axial pressure of sonic irradiation produces a turbulent flow which brings about intensive cross-mixing. Measurements have shown that liquid flows with speeds of the order of 1 m/s are attained here. This device for the batchwise production of disperse mixtures is particularly suitable for laboratory measurements.

In accordance with a second embodiment, the device of the invention has a flow cell. In this case the housing is designed as a through-flow reaction channel, with an inlet and an outlet, the reaction chamber being a subsection of the through-flow reaction channel. The width of the channel is that extent of the channel which runs essentially normal to the flow direction. In accordance with the invention, therefore, the emitting surface covers the entire width of the flow channel transversely to the flow direction. That length of the emitting surface which is perpendicular to this width, in other words the length of the emitting surface in the flow direction, defines the effective range of the ultrasound. In accordance with one advantageous variant of this second embodiment, the through-flow reaction channel has an essentially rectangular cross section. If a likewise rectangular ultrasound transmission means of appropriate dimensions is installed in one side of the rectangle, particularly effective and uniform sonication is ensured. Owing to the turbulent flow conditions which prevail in the ultrasonic field, however, it is also possible and nondisadvantageous to employ a circular transmission means. In accordance with the invention, moreover, it is possible instead of a single ultrasound transmission means to arrange two or more separate transmission means which are connected in series as viewed in the flow direction. In such an arrangement it is possible for both the emitting surfaces and the depth of the reaction chamber, in other words the distance between the emitting surface and the floor of the through-flow channel, to vary.

It has surprisingly been found that the process parameters determined with the first embodiment on the laboratory scale can be transferred directly to the conditions of continuous production by means of a flow cell if for the flow cell a specific volume $dv/dt$ is chosen which corresponds to an equivalent volume flow $dv_{eq}/dt=v/t$, where v is the volume of the reaction vessel on the laboratory scale and t is the sonication period. Said specific volume flow is the volume flow relative to the emitting surface of the sonic transmission means. If the emitting surfaces in the case of the batchwise laboratory instrument and the continuous production instrument are identical, then the specific volume flow is equal to the actual volume flow.

A further advantage of the device of the invention is the relatively small variation in the droplet size distribution; in other words, highly uniform emulsions can be produced.

With particular advantage, the means of transmitting ultrasonic waves is designed as a sonotrode whose end remote from the free emitting surface is coupled to an ultrasonic transducer. The ultrasonic waves can be generated, for example, by exploiting the inverse piezoelectric effect. In this case, generators are used to generate high-frequency electrical oscillations (usually in the range from 10 to 100 kHz, preferably from 20 to 40 kHz), and these are converted by a piezoelectric transducer into mechanical vibrations of the same frequency and, with the sonotrode as the transmission element, are coupled into the medium that is to be sonicated. With sonotrodes of this kind it is possible to achieve high output densities and, accordingly, far-reaching cavitation fronts.

With particular preference, the sonotrode is designed as a rod-shaped, axially emitting $\lambda/2$ (or multiples of $\lambda/2$) longitudinal oscillator. A sonotrode of this kind can be fastened in an aperture of the housing by means, for example, of a flange provided on one of its nodes of oscillation. In this way the entry point of the sonotrode into the housing can be given a pressuretight design, so that the reaction chamber can be sonicated even under superatmospheric pressure.

In accordance with a further advantageous development of the device of the invention, the reaction chamber contains internals for improving the flow behavior and mixing behavior. These internals may, for example, be simple deflector plates or a wide variety of porous structures.

Advantageously, the reaction chamber is thermostatable.

In accordance with an advantageous development of the device of the invention it is possible to regulate the amplitude of oscillation of the sonotrode; in other words, the particular amplitude established is monitored on-line and, if necessary, corrected automatically. The current amplitude of oscillation can be monitored, for example, by means of a piezoelectric transducer mounted on the sonotrode, or by means of a strain gauge with downstream evaluation electronics.

The device of the invention can also be composed, in a modular fashion, from individual flow channels each with one or more sonotrodes. In a cascade arrangement of this kind it is also possible to realize a return flow or circuit operation. In this case it is possible to choose, for each of individual modules, different gap spacings between the emitting surfaces and the cell floors, and/or to integrate different internals for improving the mixing behavior. In the various modules it is also possible to vary the emitting surfaces of the sonotrodes and/or the amplitudes of oscillation.

One particularly preferred use of the device of the invention is to be seen in the production of ultrafine emulsions, i.e. emulsions having a drop diameter of less than 1 μm, which are referred to herein as miniemulsions. In this context, the device of the invention is particularly suitable for producing ultrafine emulsions from media of low viscosity, composed in part of water or monomer, it being possible for the viscosity to be within the range from a few mPas to 100 mPas.

The device of the invention is also suitable for producing multiphase emulsions, especially for incorporating particles of solids, for example of a powder, into the disperse phase of such low-viscosity emulsions.

Since the findings obtained with the device of the invention can be transferred directly from a laboratory scale to the production scale, the device is particularly suitable for the screening of emulsifying auxiliaries. It is possible, for instance, to evaluate the effectiveness of emulsifying auxiliaries, as a function of their type, combination and concentration, in terms of the achievable droplet size and the stability of the emulsion or dispersion.

The device of the invention has been found particularly advantageous for producing polymer dispersions by free-radical aqueous emulsion polymerization of ethylenically unsaturated monomers, where at least one portion of the monomers is in the form of an oil-in-water emulsion whose disperse phase may also include a further oil-soluble component.

Suitable ethylenically unsaturated monomers are in principle all those which can normally be employed for a free-radical aqueous macroemulsion polymerization. Preferably, the major proportion of the monomers to be polymerized is formed by monoethylenically unsaturated monomers A having a water-solubility of >0.01 g/l. These include olefins, such as ethylene or propene, vinylaromatic monomers, such as styrene, α-methylstyrene, o-chlorostyrene or vinyltoluenes, vinyl and vinylidene halides, such as vinyl chloride and vinylidene chloride, esters of vinyl alcohol and $C_1$–$C_8$ monocarboxylic acids, such as vinyl acetate, propionate, n-butyrate or hexanoate, esters of allyl alcohol and $C_1$–$C_8$ monocarboxylic acids, such as allyl acetate, propionate, n-butyrate and hexanoate, esters of preferably $C_3$–$C_6$ α,β-monoethylenically unsaturated mono- and dicarboxylic acids, especially acrylic, methacrylic, maleic, fumaric and itaconic acid, with in general $C_1$–$C_{12}$-, preferably $C_1$–$C_8$- and, in particular, $C_1$–$C_4$-alkanols, such as, in particular, methyl, ethyl, n-butyl, tert-butyl, isobutyl and 2-ethylhexyl acrylate and methacrylate, dimethyl maleate or n-butyl maleate, nitriles of α,β-monoethylenically unsaturated carboxylic acids, such as acrylonitrile, and also $C_{4-8}$ conjugated dienes, such as 1,3-butadiene and isoprene. Particularly preferred monomers A are styrene and esters of acrylic and methacrylic acid with $C_1$–$C_8$-alkanols.

The monomers A also embrace those monomers A' whose homopolymers are of increased solubility in water (i.e. >60 g/l at 25° C.). Such monomers A' are used as modifying monomers and are generally employed in amounts of <20% by weight, based on the overall amount of the monomers to be polymerized, preferably <10% by weight and, in particular, <5% by weight, based on the monomers to be polymerized. Examples of monomers A' are $C_3$–$C_6$ monoethylenically unsaturated mono- and dicarboxylic acids and their amides, examples being acrylic acid, methacrylic acid, maleic acid, itaconic acid, acrylamide, methacrylamide and maleimide. Further examples of monomers A' are ethylenically unsaturated sulfonic acids and their water-soluble salts, such as vinylsulfonic, allylsulfonic, methallylsulfonic or (meth)acrylamido-2-methylpropanesulfonic acids, and also N-vinyllactams having 3 to 6 carbons, such as N-vinylpyrrolidone.

For the stability of the emulsion in particular it has been found advantageous for the monomers to be polymerized to comprise not only monomers A having a water-solubility of >0.01 g/l but also monomers B which have a water-solubility of <0.01 g/l at 25° C. and 1 atm.

The ethylenically unsaturated monomers to be polymerized preferably include from 50 to 99.5% by weight, based on the overall amount of monomers A and B, in particular from 80 to 99% by weight and, with very particular preference, from 90 to 98% by weight of at least one monomer A and from 0.5 to 50% by weight, in particular from 1 to 20% by weight and, with very particular preference, from 2 to 10% by weight of at least one monomer B.

Examples of monomers B having the low water-solubility required as above are 2- and 4-n-butylstyrene, p-tert-butylstyrene, esters of $C_3$–$C_6$ α,β- monoethylenically unsaturated carboxylic acids and alkanols having at least 12 carbons (generally up to 30 carbons), such as lauryl acrylate and stearyl acrylate, for example.

Further suitable such monomers B are esters of vinyl alcohol or allyl alcohol with alkanecarboxylic acids having a least 9 carbons (generally up to 30 carbons), such as vinyl nonanoate, vinyl decanoate, vinyl laurate and vinyl stearate, for example, and also commercially available monomers VEOVA® 9–11 (VEOVA X is a tradename of Shell and stands for vinyl esters of carboxylic acids which are also referred to as Versatic® X acids). Further suitable such monomers B are macromonomers, such as oligopropene acrylate (in very general terms, macromonomers are polymeric or oligomeric compounds having at least one, usually terminal, ethylenically unsaturated double bond; for usefulness as a monomer B of very low solubility in water their relative number-average molecular weight should preferably be not more than 100,000; in general this relative number-average molecular weight is from 1000 to 50,000, or from 2000 to 50,000; macromonomers are known to the skilled worker; their production is described, for example in Makromol. Chem. 223 (1994) 29–46). Very generally, suitable monomers B of very low solubility in water are all those whose molal solubility at 25° C. and 1 atm in water is less than the corresponding solubility of lauryl acrylate. Examples of such monomers B include the methacryloyl-polybutyl acrylate AB-6 and the methacryloyl-polystyrene A5-6 from Toa Gosei Kagaku KK (JP), both of which have a number-average relative molecular weight of 6000. Also suitable as compounds B are Polyol 130 and Polyol 110 from Hüls AG (stereospecific, low-viscosity polybutadiene (75% 1,4-cis, 24% 1,4-trans, 1% vinyl), whose dynamic viscosity at 20° C. is 3000 mPa·s) as macromonomers of low solubility in water.

Instead of the use of monomers B, the stability of the emulsion can alternatively be improved by using noncopolymerizable compounds B' having a water-solubility of <0.01 g/l. Such compounds B' can be used together with or instead of the monomers B. Compounds B' are preferably used in amounts of less than 10% by weight, based on the overall amount of the monomers A and B.

An example of a compound B' is Acronal® A 150 F, a poly-n-butyl acrylate from BASF AG, whose 50% strength by weight solution in ethyl acetate at 23° C. in 1 atm has a viscosity (determined in accordance with ISO 3219, DIN 53019, at 250 s$^{-1}$) of 33 mPa·s.

Also suitable as compound B' is PnBa, a high-temperature solution polymer of n-butyl acrylate (120° C. in isopropanol) having a K value of 24 determined at 25° C. in isopropanol. K is a relative viscosity number which is determined in analogy to the method of DIN 53726. It constitutes the flow rate of the pure solvent relative to the flow rate of a 0.1% strength by weight solution of the polymer in the same solvent (cf. also Cellulosechemie, Vol. 13 (1932), pp. 58–64 and Kirk-Othmer Encyclopedia of Chemical Technology, Vol. 23, pp. 967–968). The K value is a measure of the average molecular weight of a polymer, where a high K value corresponds to a high average molecular weight.

Other possible compounds B' are resins, such as colophony resins (cf. Ullmanns Encycl. Techn. Chem., 4th edition (1976), Vol. 12, pp. 525–538) and hydrocarbon resins (Cf. Encycl. Polym. Sci. Eng. (1987) vol. 7, pp. 758–782), such as Kristalex F 85 from Hercules. An example which which may be mentioned is Foral® 85 E, a glyceryl ester of highly hydrogenated colophony resin (softening point: 86° C.) from Hercules. Further suitable compounds B' are polystyrenes (cf. C. M. Miller et al., J. Polym. Sci.: Part A: Polym. Chem. 32, (1994) 2365–2376).

Yet further suitable compounds B' are water-insoluble, oil-soluble substances, such as aliphatic and aromatic hydrocarbons (e.g. hexadexane), film-forming auxiliaries, or plasticizers such as Plastilit® 3060 from BASF (a technical-grade mixture of the di-n-butyl esters of $C_4$–$C_6$ dicarboxylic acids).

The monomers to be polymerized may also comprise crosslinking monomers C. These are, in particular, monomers having at least 2 nonconjugated double bonds. Insofar as they are desired, such monomers C are employed in an amount of from 0.1 to 30% by weight, based on the overall amount of the monomers to be polymerized, in particular from 0.5 to 20% by weight and, with very particular preference, from 1 to 10% by weight.

Examples of suitable monomers C include the vinyl, allyl and methallyl esters of the abovementioned ethylenically unsaturated carboxylic acids, as well as the esters of these acids with tricyclodecenyl alcohol, especially the esters of methacrylic and of acrylic acid, the esters of the abovementioned ethylenically unsaturated carboxylic acids with polyhydric alcohols, such as ethylene glycol diacrylate, ethylene glycol dimethacrylate, butanediol diacrylate, butanediol dimethacrylate, hexanediol diacrylate, hexanediol dimethacrylate, tris(hydroxymethyl)ethane triacrylate and trimethacrylate, pentaerythritol triacrylate and trimethacrylate, and the allyl and methallyl esters of polyfunctional carboxylic acids, such as diallyl maleate, diallyl fumarate and diallyl phthalate. Other typical monomers C are compounds such as divinyl benzene, divinyl urea, diallyl urea, triallyl cyanurate, N,N'-divinyl- and N,N'-diallylimidazolidin-2-one, and also methylenebisacrylamide and methylenebismethacrylamide.

Instead of or together with the monomers C it is also possible to use monomers D, which instead of the at least one further ethylenically unsaturated bond have a functional group which is capable of subsequent crosslinking of the polymer. Examples of monomers D are N-alkylolamides of the abovementioned ethylenically unsaturated carboxylic acids, an example being N-methylol(meth)acrylamide, the hydroxyalkyl esters of the abovementioned ethylenically unsaturated carboxylic acids, especially hydroxyethyl (meth)acrylate, the bisacetonylamides of the abovementioned ethylenically unsaturated carboxylic acids, especially N,N-bisacetonyl(meth)acrylamide, and also the vinyl, allyl and methallyl glycidyl ethers, glycidyl esters of the abovementioned ethylenically unsaturated carboxylic acids, such as glycidyl (meth)acrylate, and also the esters of acetylacetic acid with the hydroxyalkyl esters of the abovementioned ethylenically unsaturated carboxylic acids, e.g. acetylacetoxyethyl (meth)acrylate. These monomers D, if desired, can be copolymerized in amounts of from 0.1 to 30% by weight, based on the overall amount of the monomers to be polymerized. In general the overall amount of monomers C and monomers D will not exceed 30% by weight and, in particular, 10% by weight, based on the overall amount of the monomers to be polymerized. In one preferred embodiment the monomers to be polymerized include at least one monomer C and/or D in an overall amount of >0.1% by weight.

In general, the emulsion polymerization is conducted such that in a first step a miniemulsion is produced from the monomers to be polymerized and from any other oil-soluble components, the monomer droplets in said miniemulsion having a diameter of <1 $\mu$m. Subsequently, the emulsion is brought into contact with at least one initiator under temperature conditions in which the initiator triggers the free-radical polymerization of the ethylenically unsaturated bonds.

In this case the aqueous emulsion is judiciously produced starting from conventional, coarsely disperse, crude, oil-in-water emulsions of the monomers. Subsequently, the crude emulsion is converted to the miniemulsion by ultrasonication in the device of the invention.

Common water-soluble emulsifiers in this context include not only anionic and cationic but also nonionic emulsifiers. It is preferred to use anionic and/or nonionic emulsifiers. Examples of suitable emulsifiers are ethoxylated mono-, di- and tri-alkylphenols (EO units: 3 to 50, alkyl: $C_4$ to $C_9$), ethoxylated fatty alcohols (EO units: 3 to 50, alkyl: $C_6$ to $C_{36}$) and also alkali metal salts and ammonium salts of alkyl sulfates (alkyl: $C_8$ to $C_{12}$), of sulfuric monoesters of ethoxylated alkanols (EO units: 4 to 30, alkyl: $C_{12}$ to $C_{18}$) and ethoxylated alkylphenols (EO units: 3 to 50, alkyl: $C_4$ to $C_9$), of alkylsulfonic acids (alkyl: $C_{12}$ to $C_{18}$) and of alkylarylsulfonic acids (alkyl: $C_9$ to $C_{18}$). Up to 30 mol-% of the ethylene oxide units can also be replaced by other alkylene oxide units, especially propylene oxide units. Further suitable emulsifiers are given in Houben-Weyl, Methoden der organischen Chemie, Volume XIV/1, Makromolekulare Stoffe [Macromolecular substances], Georg-Thieme Verlag, Stuttgart, 1961, pages 192 to 208. It is of course also possible to employ these emulsifiers in a mixture with protective colloids, such as polyvinyl alcohols, modified starches, cellulose derivatives or polyvinylpyrrolidone. These have little capacity for reducing the surface tension of the water and generally have relative molecular weights of more than 1000.

Further suitable emulsifiers are the salts of bis (phenylsulfonyl) ethers which have a $C_4$–$C_{24}$-alkyl group on at least one phenylsulfonyl group. The alkyl group, which can be linear or branched, preferably has 6 to 18 carbons and, in particular, 6, 12 or 16 carbons. The salts are preferably sodium, potassium or ammonium salts or mixed forms of these salts, with particular preference being given to the sodium salts. The sodium salts are particularly advantageous if they feature at least one alkyl group of 12 carbons and are branched. Use is frequently made of technical-grade mixtures containing from 50 to 90% by weight of the monoalkylated product, an example being Dowfax® 2A1 (trademark of Dow Chemical Company). These compounds are commonly known, from U.S. Pat. No. 4,269,749, for example, and are obtainable commercially.

The device of the invention can also be employed advantageously for other typical applications of ultrasonic treatment devices: for example, for deagglomerating particles of solids or for degassing liquids. The present invention is described in more detail below in relation to exemplary embodiments depicted with reference to the attached drawing.

Figure 2:
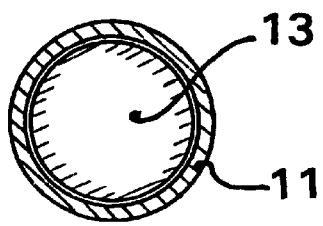
FIG. 2 shows a sectional view of the device of FIG. 1 along the line II—II.
Figure 3:
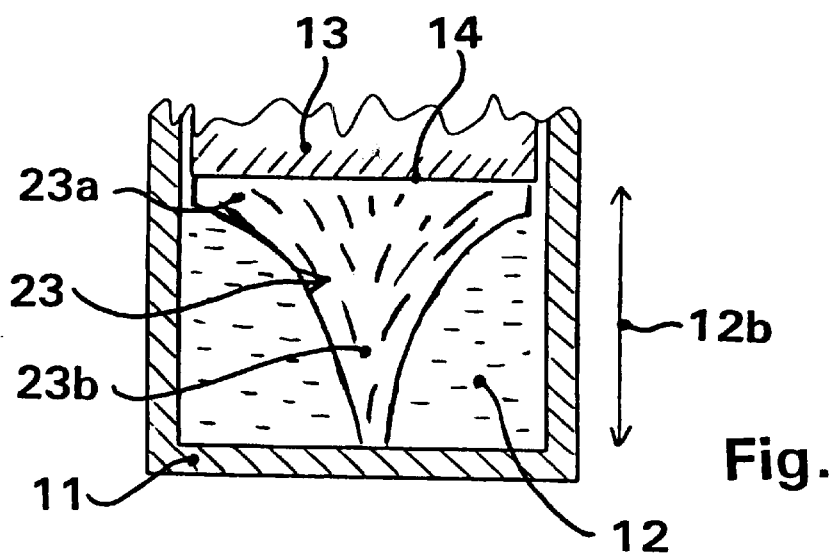
FIG. 3 shows a partial view of the device of FIG. 3, in which the course of the cavitation field is indicated diagrammatically.

FIG. 1 depicts the diagrammatic cross section of a batchwise-operating ultrasound device 10 of the invention. The ultrasound device has a thermostatable housing 11 which surrounds a reaction chamber 12 in which the medium to be emulsified is located. Protruding into the housing 11 is a sonotrode 13 which can be used to ultrasonicate the medium in the reaction chamber 12. In the example shown the sonotrode is designed as a λ/2 longitudinal oscillator which is held at the node of oscillation by a flange 20. The flange 20 is located on the upper aperture 21 of the housing 11, so that the sonotrode 13 can be guided into the housing 11 in a pressuretight manner. Alternatively, it is possible for the sonotrode 11, without a sealing flange, to protrude into the reaction chamber 12 of the housing 11. In the case of the batchwise-operating ultrasound device 10 depicted, the surface of the reaction chamber 12 corresponds essentially to the emitting surface 14 of the sonotrode 13. This becomes clear in particular from FIG. 2, which shows a section of the device of FIG. 1 along the line II—II. The depth 12b of the reaction chamber 12 is chosen such that the cavitation field 23 generated by the ultrasound is effective over the entire depth. This cavitation field is depicted in greater detail in FIG. 3. It can be seen that the cavitation field 23 consists essentially of two regions: an essentially cylindrical near field 23a, whose diameter corresponds to the diameter of the emitting surface 14 of the sonotrode 13. The depth of the cylindrical region is termed the near-field length $l_N$. This is followed by a far field 23b, whose diameter becomes smaller, essentially exponentially, with increasing distance from the emitting surface 14. In the example depicted, the reaction chamber 12 contains internals 22 (not shown in FIG. 3 for greater clarity) which promote the mixing of the medium. On the end 18 of the sonotrode 13 that is remote from the emitting surface 14, the sonotrode is connected to an ultrasonic transducer 19. The ultrasonic transducer 19 has a piezoelectric crystal which is excited to mechanical vibrations by a high-frequency alternating voltage.

Figure 4:
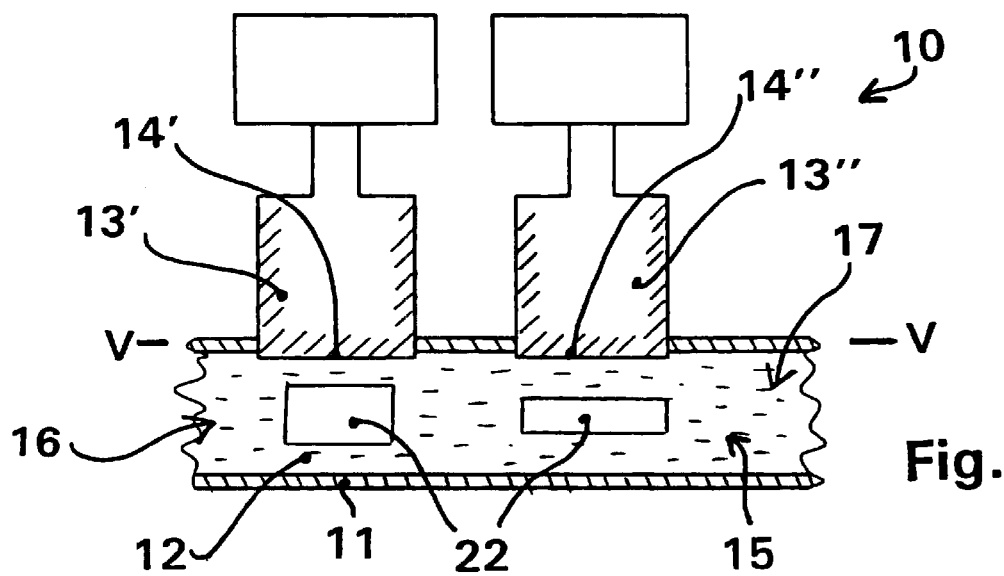
FIG. 4 shows a diagrammatic cross section of a continuously operating embodiment of the device of the invention.

FIG. 4 depicts a continuously operating embodiment of the ultrasound device 10 of the invention. Elements which correspond to the elements described in connection with the embodiment depicted in FIGS. 1 to 3 share the same reference numerals. In the case of the continuously operating ultrasound device 10, the reaction chamber 12 is designed as a flow channel 15. The flow channel 15 has an inlet 16 and an outlet 17. Protruding into the flow channel are two sonotrodes 13', 13", arranged sequentially in the flow direction. As is particularly evident from FIG. 5, which depicts a section along the line V—V from FIG. 4, the emitting surfaces 14', 14", of the sonotrodes are designed so that the width 14a of the emitting surfaces 14', 14", corresponds essentially to the width 12a of the reaction chamber 12, or of the through-flow reaction channel 15. In the example depicted, the cross section of the sonotrodes is circular. However, it is also possible to use square sonotrodes, which would lead to even more uniform sonication over the entire width 12a of the channel 15.

Figure 6:
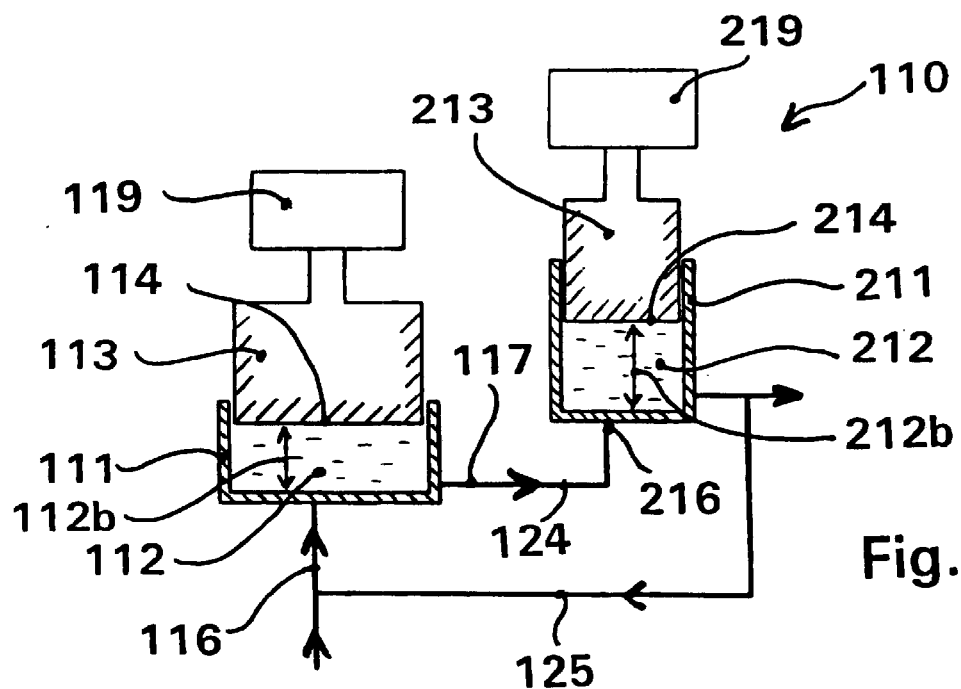
FIG. 6 shows a diagrammatic cross section of a continuously operating, modular embodiment of the device of the invention.

FIG. 6 depicts a diagrammatic cross section of a continuously operating, modular embodiment of the ultrasound device 110 of the invention. In this case, a first module consists of a housing 11, which surrounds a reaction chamber 112. The sonotrode 113, coupled to an ultrasonic transducer 119, protrudes into the reaction chamber 112. The medium is supplied to the first module by way of an inlet 116 and flows via an outlet 117 into the inlet 216 of a second module, which consists of a housing 211 which surrounds a reaction chamber 212. A second sonotrode 213 coupled to a second ultrasonic transducer 219 protrudes into the reaction chamber 212. It can be seen that both the emitting surfaces 114 and 214 of the sonotrodes 113 and 213, respectively, and the depths 112b and 212b of the reaction chambers 112 and 212, respectively, are different. The two modules of the ultrasound device are cascade-connected by means of a line 124, partial return flow of the medium being ensured by a return flow line 125 in the example depicted.

EXAMPLES

Example 1

Transferability of Batch Experiments to Continuous Operation

Emulsification experiments were conducted with a rapeseed oil/water mixture, both batchwise on the laboratory scale and continuously on the pilot plant scale. The rapeseed oil (type: Raffiniert RH6, from Lessieur, Mannheim) formed the disperse phase, in a concentration of 20%. The emulsifier employed in each case was Steinapol®-NLS (sodium lauryl sulfate—1% based on the oil phase). The sonotrode diameter was 34 mm; the diameter of the vessel or, in the case of continuous operation, the width of the flow cell was in each case 36 mm. The maximum output of the sonotrode was 500 W at an ultrasound frequency of 20 kHz. In batchwise operation, the sonication period t was varied, and was used to calculate an equivalent volume flow $dv_{eq}/dt=v/t$, while in continuous operation the volume volume $dv/dt$ itself was varied. Drop size analysis was by dynamic light scattering measurements with a COULTER® N4. The parameter measured in each case was an average drop diameter, which is defined as the z-average.

Figure 7:
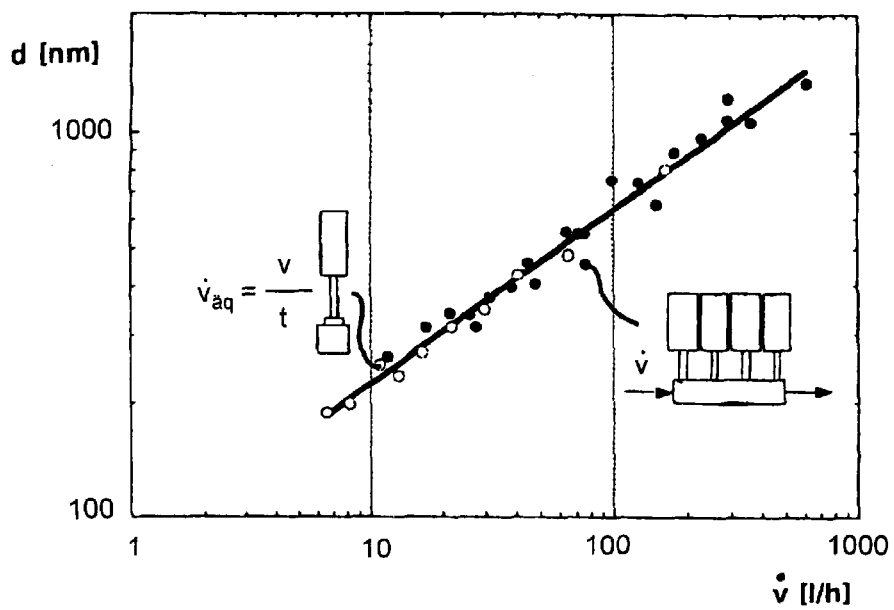
FIG. 7 is a diagram depicting the dependency of the droplet diameter on the volume flow in the experiments of Example 1.

The result is shown in the diagram in FIG. 7, which depicts the average diameter of the droplets as a function of the volume flow (open circles: batch, solid circles: continuous experiment). Very good agreement can be seen between the drop diameters obtained in the batchwise and in the continuous experiments, respectively, which demonstrates the transferability of the laboratory experiments to the production scale.

EXAMPLE 2

Assessing the Effect of Emulsifier Type and Emulsifier Concentration on the Drop Size Attained To assess the effect of emulsifier, emulsification experiments were conducted in an apparatus in accordance with FIG. 1 of the present invention (albeit in an open vessel arrangement, i.e. without a sealing flange). Otherwise, the experimental conditions are as in Example 1. The starting materials chosen included a 20% strength monomer mixture (95% styrene/5% stearyl acrylate) in water. The emulsifiers chosen were Steinapol®-NLS and Disponil® FES 77 (registered trademark of Henkel). The concentration of the emulsifier was 0.3%, 0.6% and 1.2% NLS, based on the monomer phase and on equimolar amounts of the emulsifier Disponil FES 77. The sonication period was in each case between 1 and 25 seconds. The ultrasonic output was in each case $1.6 \cdot 10^7$ W/m$^3$.

Figure 8A:
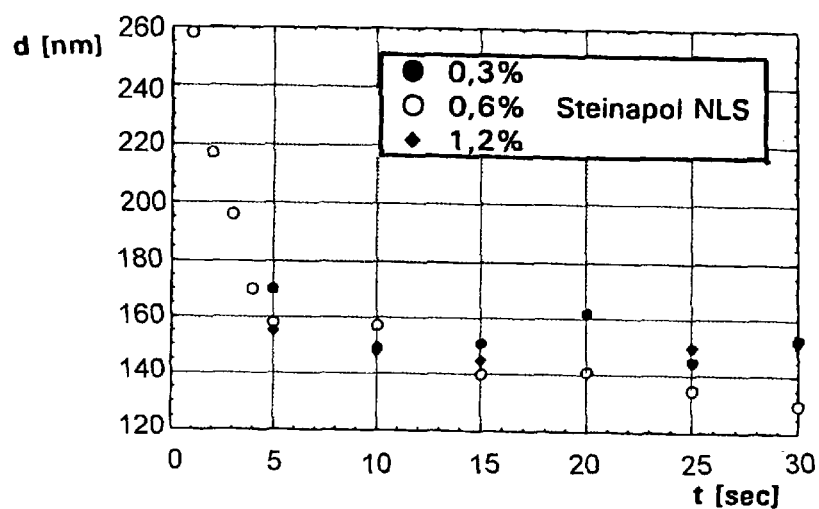
FIG. 8 shows diagrams depicting the dependency of the droplet diameter on the emulsifier concentration in the experiments of Example 2.
Figure 8B:
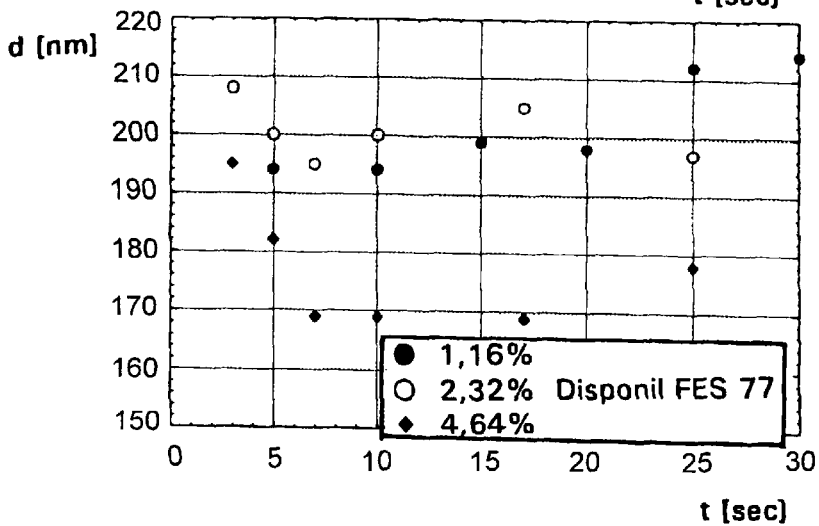

The results are depicted in the diagrams of FIG. 8A and 8B as the droplet diameter d as a function of the sonication period t. In the case of the system under investigation here, the smallest drop size (about 140 nanometers) and the most stable emulsions were attained with the emulsifier Steinapol NLS in a concentration of 0.6% based on the monomer phase. The emulsifier Disponil FES 77 is less suitable for this system.

Examples 1 and 2 demonstrate that with the aid of the present invention it is possible even on the laboratory scale to assess, with great rapidity and simplicity, the effect of the type and concentration of emulsifier (and the combination of different emulsifiers) and also the effect of the power output in terms of the emulsification result, and so ultimately in respect of the drop diameter, for various systems.

EXAMPLE 3

Figure 5:
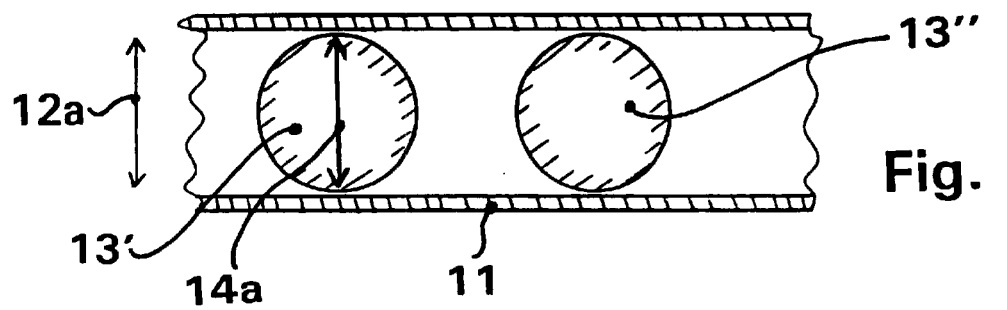
FIG. 5 shows a sectional view of the device of FIG. 4 along the line V—V.

Continuous Production of an Emulsion with Drop Sizes Markedly Smaller than 1 μm For the continuous emulsification a flow apparatus was employed as is depicted diagrammatically in FIGS. 4 and 5, but without internals for improving the flow and mixing behavior. The system investigated was as follows: 20% monomer mixture (consisting of 95% styrene/5% stearyl acrylate) and 80% water. The emulsifier employed was Steinapol NLS in a concentration of 0.6% based on the monomer phase. The drop sizes obtained in each case are shown in Table 1:

TABLE 1

| Experiment No. | Mass flow [kg/h] | Drop diameter [nm] |
|---|---|---|
| 1 | 7.5 | 191 |
| 2 | 16.4 | 205 |
| 3 | 3.25 | 152 |
| 4 | 3.8 | 155 |
| 5 | 8.5 | 188 |
| 6 | 6.4 | 174 |
| 7 | 13.2 | 187 |

The results show that with the apparatus of the invention it is possible to produce miniemulsions with a high throughput. Emulsification results comparable in terms of the achievable drop diameter can be obtained even with different systems. Larger mass flows can easily be achieved by appropriate modifications to the device of the invention.

EXAMPLE 4

Degassing

With a device which was open but was otherwise in accordance with that depicted in FIG. 1, experiments were conducted to degas liquids. To this end, 1000 g of a 20% strength monomer solution (consisting of 80% n-butyl acrylate and 20% stearyl acrylate) and 80% water were sonicated. The concentration of dissolved oxygen was measured with a Process Unit 73 $O_2$ from Knick and with a measuring probe from Mettler which is based on the principle of the electrochemical measurement of oxygen. Prior to sonication, an oxygen saturation concentration of 9 mg of $O_2/l$ (at 20° C.) was established in the solution by gassing with atmospheric oxygen through a frit.

On ultrasonication, the concentration of dissolved oxygen in the monomer/water mixture fell within five minutes from 9 to 7.5 mg of $O_2/l$. By means of simultaneous sonication and introduction of nitrogen through a frit it was possible to achieve a drastic reduction in the concentration of dissolved oxygen. In this case, the concentration of dissolved oxygen after 5 minutes of sonication was less than 1 mg of $O_2/l$. In contrast, the introduction of nitrogen alone, i.e. without additional sonication, led to a reduction in the concentration of dissolved oxygen to values of only 5 mg of $O_2/l$.

EXAMPLE 5

Deagglomeration

A Lucarotin dispersion (20 A) which initially had a particle size distribution of between 1 and 10 μm was found at the beginning of the experiment to have particle sizes of between 1 and 100 μm; in other words, agglomerates were present. The particle sizes were determined by laser light scattering (Fraunhofer diffraction).

Using a device as in Example 4, the agglomerated dispersion was sonicated. Following a sonication period of 20 seconds in the intensive ultrasound field it was possible by measurement to find that there had been a return to the particle size distribution of between about 1 and 10 μm.

We claim:

1. A method for determining process parameters of a production scale flow cell device, which comprises the steps of:
    a) effecting an emulsification to prepare a dispersed mixture by ultrasound using a device in a batchwise laboratory scale, and determining process parameters therefor; and
    b) effecting an emulsification to prepare a dispersed mixture by ultrasound in a continuous production scale with a flow cell by transferring directly there to the process parameters determined in step a), provided that a specific volume, dv/dt, is chosen for the flow cell which corresponds to an equivalent volume flow, $dv_{eq}/dt=vt$, where v is a volume of a reaction chamber of a device, on a laboratory scale, and t is a sonication period;
    wherein said device comprises:
    a) a housing; and
    b) a reaction chamber within the housing and at least one sonotrode having a free emitting surface which is directly in effective connection with the reaction chamber and whose end remote from the free emitting surface is coupled to an ultrasonic transducer, wherein the sonotrode is designed as a rod-shaped, axially emitting longitudinal oscillator with said emitting surface corresponding essentially to the surface of the reaction chamber, and wherein the reaction chamber depth which is essentially vertical with respect to the emitting surface is lower than a maximum effective depth of the sonotrode.

2. The method of claim 1, which effects screening of emulsifying auxiliaries for achievable droplet size of an emulsion.

3. The method of claim 2, wherein said emulsion has an average droplet diameter of less than 1 μm.

4. The method of claim 1, wherein in step b), a crude emulsion is converted to a miniemulsion by ultrasonication.

5. The method of claim 1, which effects screening of emulsifying auxiliaries for emulsion stability.

6. A method for determining process parameters of a production scale flow cell device, which comprises the steps of:
    a) effecting an emulsification to prepare a dispersed mixture by ultrasound using a device for producing disperse mixtures by means of ultrasound, in a batchwise laboratory scale, and determining process parameters therefor; and b) effecting an emulsification to prepare a dispersed mixture by ultrasound in a continuous production scale with a flow cell by transferring directly there to the process parameters determined in step a)

wherein said device for producing disperse mixtures comprises a housing (11), a reaction chamber (12) within the housing and at least one sonotrode (13) having a free emitting surface (14) which is directly in effective connection with the reaction chamber (12) and whose end (18) remote from the free emitting surface is coupled to an ultrasonic transducer (19), wherein the sonotrode (13) is designed as a rod-shaped, axially emitting longitudinal oscillator with said emitting surface (14) corresponding essentially to the surface of the reaction chamber (12), and wherein the reaction chamber (12) depth (12*b*) which is essentially vertical with respect to the emitting surface (14) is lower than the maximum effective depth of the sonotrode (13).

7. The method of claim 6, which effects screening of emulsifying auxiliaries for achievable droplet size of an emulsion.

8. The method of claim 6, which effects screening of emulsifying auxiliaries for emulsion stability.

9. A method for determining process parameters of a production scale flow cell device, which comprises the steps of:

a) effecting an emulsification to prepare a dispersed mixture by ultrasound using a device for producing disperse mixtures by means of ultrasound, in a batchwise laboratory scale, and determining process parameters therefor; and b) effecting an emulsification to prepare a dispersed mixture by ultrasound in a continuous production scale with a flow cell by transferring directly there to the process parameters determined in step a)

wherein said device for producing disperse mixtures comprises a housing (11), a reaction chamber (12) within the housing which is arranged as a subsection of a through-flow reaction channel (15), and at least one sonotrode (13) having a free emitting surface (14) which is directly in effective connection with the reaction chamber (12) and whose end (18) remote from the free emitting surface is coupled to an ultrasonic transducer (19), wherein the sonotrode (13) is designed as a rod-shaped, axially emitting longitudinal oscillator with said emitting surface (14) of the sonotrode extending essentially over the entire width of the channel (15) and wherein the reaction chamber (12) depth (12*b*) which is essentially vertical with respect to the emitting surface (14) is lower than the maximum effective depth of the sonotrode (13).

* * * * *